United States Patent [19]

Thirion

[11] 3,959,996
[45] June 1, 1976

[54] ANTI-THEFT DEVICE FOR AUTOMOBILE VEHICLES

[75] Inventor: André Thirion, Dijon, France

[73] Assignee: Antivols Simplex S.A., Dijon-Saint-Apollinaire, France

[22] Filed: May 23, 1975

[21] Appl. No.: 580,410

[30] Foreign Application Priority Data

June 4, 1974 France .............................. 74.19164

[52] U.S. Cl. .................................. 70/186; 70/252
[51] Int. Cl.$^2$ .......................................... B60R 25/02
[58] Field of Search .............................. 70/186, 252

[56] References Cited
UNITED STATES PATENTS

| | | | |
|---|---|---|---|
| 3,530,697 | 9/1970 | Warnod ................................ | 70/252 |
| 3,566,635 | 3/1971 | Wolter .................................. | 70/252 |
| 3,650,131 | 3/1972 | Eichenauer .......................... | 70/252 |
| 3,840,714 | 10/1974 | Arman ................................. | 200/44 |
| 3,863,473 | 2/1975 | Neale ................................... | 70/186 |

FOREIGN PATENTS OR APPLICATIONS

| | | | |
|---|---|---|---|
| 1,539,404 | 8/1968 | France ................................. | 70/252 |
| 1,022,858 | 3/1966 | United Kingdom .................. | 70/252 |

*Primary Examiner*—Albert G. Craig, Jr.
*Attorney, Agent, or Firm*—Holman & Stern

[57] ABSTRACT

An anti-theft device for automobile vehicles of the type comprising a lock having a barrel actuated by a key. A locking bolt member is provided extending longitudinally of the barrel and the barrel has a cam profile cooperating with the bolt member for shifting the latter in a direction parallel to the axis of the barrel. The bolt member is extended by a stem which is floatably mounted so as to be transversely pivotable with respect to the axis of the bolt member. The stem is provided with a tab cooperating with a cam profile integral with the barrel, the cam controlling its transverse displacement. The stem has at the end opposed to the bolt member a transverse nose portion adapted to be cooperable with a radial recess in the body of the anti-theft device. Elastically yieldable means bias the nose portion toward the recess and a radially movable push-member is disposed in the bottom of the recess and is elastically biassed outwardly of the recess. A key sensor is radially mounted in the barrel and is cooperative with the push-member. In a preferred embodiment, the cam profile has a helical portion adjacent to a radial plateau provided with a substantially radial projection.

3 Claims, 5 Drawing Figures

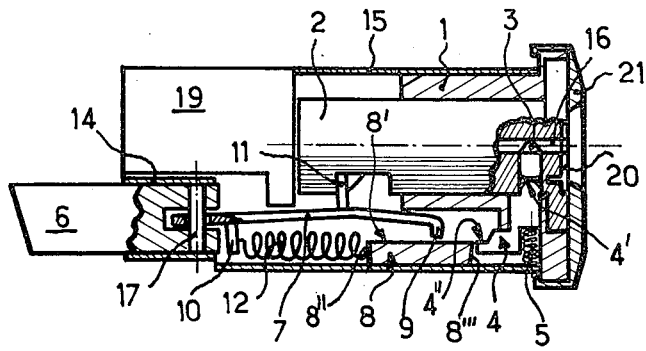
FIG_1_
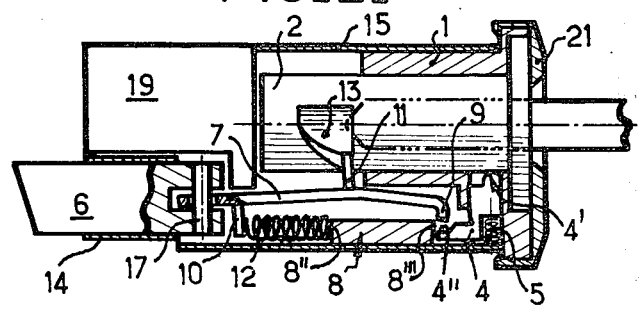
FIG_2_
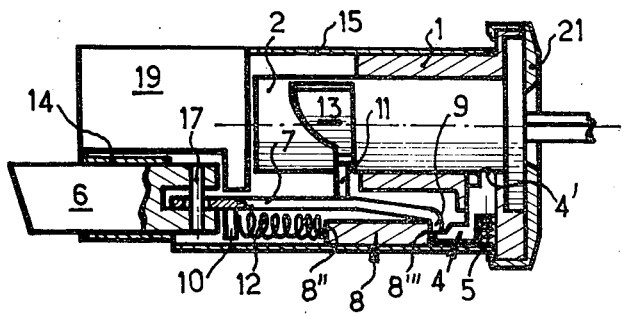
FIG_3_
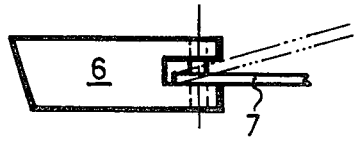
FIG_4
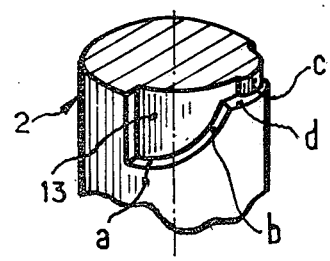
FIG_5_

ANTI-THEFT DEVICE FOR AUTOMOBILE VEHICLES

The invention relates to a novel anti-theft device for automobile vehicles.

In known anti-theft devices, the bolt member is driven in translation by the rotation of a lock barrel, usually through a cam which is integral with said barrel. This bolt member is capable of occupying a withdrawn position and a locking position in which it locks a part essential to the operation of the vehicle, for example the steering column.

For reasons of safety, it is essential that the bolt member be incapable of occupying its locking position so long as the key has not been removed, at least partially, from the lock. To satisfy this safety requirement, many solutions have been proposed which are all complicated and costly and sometimes unreliable.

An object of the invention is to overcome these drawbacks of known anti-theft devices and to provide a novel anti-theft device which is simpler than the known devices and yet is absolutely reliable.

According to the invention, there is provided an anti-theft device for automobile vehicles of the type comprising a lock having a barrel actuated by a key, a locking bolt member extending longitudinally of said barrel, said barrel having a cam profile cooperating with the bolt member for shifting the latter in a direction parallel to the axis of the barrel, wherein the bolt member is extended by a stem which is floatably mounted so as to be transversely pivotable with respect to the axis of the bolt member, said stem being provided with a tab cooperating with a cam profile integral with said barrel which cam controls its transverse displacement, said stem having at the end thereof opposed to the bolt member a transverse nose portion adapted to be cooperable with a radial recess in the body of the anti-theft device, elastically yieldable means biasing said nose portion toward said recess, a radially movable push-member disposed in the bottom of said recess and elastically biased outwardly of said recess, and a key sensor radially mounted in the barrel and cooperative with said push-member.

In a preferred embodiment, the cam profile has a helical portion adjacent to a radial plateau provided with a substantially radial projection.

The latter embodiment permits employing a single cam profile for controlling the longitudinal displacement through the stem and the locking of the bolt member in the withdrawn position by cooperation of its nose portion with the recess in the body.

The invention will be understood from the ensuing description with reference to the accompanying drawing, in which:

FIG. 1 is an axial sectional view of one embodiment of an anti-theft device according to the invention, the key having been withdrawn and the bolt member being in its locking position;

FIG. 2 is the same axial sectional view as FIG. 1, the key having been engaged and the rotor having been rotated to a position in which the bolt member has reached its fully withdrawn position;

FIG. 3 is the same axial sectional view as FIGS. 1 and 2, the rotor being in its normal "ON" position;

FIG. 4 is a detail view of the assembly comprising the bolt member and stem, and FIG. 5 is a perspective view of the cam of the rotor.

In the embodiment shown in FIG. 1, the body 1 receives a rotor 2 which has a recess in which is radially slidable a key sensor 3 which is urged into the key passage by a push-member 4 disposed in the stator and subjected to the action of a compression coil spring 5. One end 4' of the push-member 4 is partly engaged in the recess of the rotor, finger portion 4" of the push-member being radially slidable in a recess in the stator defined by a shoulder 8''' of the body.

The anti-theft device comprises a longitudinal bolt member 6 extended by a stem 7 mounted to pivot about a pin 17 so as to be radially movable as shown in FIG. 4. The bolt member stem 7 is bent at an angle at the end thereof opposed to the bolt member 6 so as to form a nose portion 9. It also comprises tabs 10 and 11 which are bent at an angle in opposite directions.

The tab 10 is subjected to the thrust exerted by a spring 12 which bears at its other end against a shoulder 8" of the body 1 which defines with the shoulder 8''' a longitudinal projection 8 defining a support surface 8'.

The nose portion 9 bears against the part 8 of the stator throughout the return movement of the bolt member until the bolt member has reached the fully withdrawn position (FIG. 2). The fact that the nose portion 9 bears against the support surface 8' of the body 1 causes the tab 11 to be applied against a central cylindrical cam 13 carried by the rotor 2 so that the tab 11 follows the working surface of the cam. This surface has four parts (FIG. 5): $a$, $b$, $c$, $d$.

By its cooperation with the tab 11, the helical ramp $b$ converts the rotation of the rotor 2 into a translation of the stem 7 and of the bolt member 6 in accordance with a law governed by the angular positions of the rotor and key.

The part $d$ is a circular ramp which is slightly less recessed than the rest of the working surface and forms a plateau. The part $c$ is an axial ramp which returns the tab 11 to the ramp $d$.

A bolt member guide 14 integral with the stator guides the bolt member 6.

The push-member 4 also performs the function of positioning the rotor 2 in the normal "ON" position shown in FIG. 3.

The lock comprising the rotor 2 and the stator 1 is housed in a tube 15 which acts as a sheath.

The head of the rotor 2 is provided with an embellishing cover plate 20 connected to rotate with the rotor and held in position by an embellishing finishing cap 21 which caps the stator 1.

The anti-theft device operates in the following manner:

Beginning with the "OFF" position with the key withdrawn shown in FIG. 1, the bolt member is in its extended position and thus performs its locking function. The push-member 4, biased by the spring 5, is engaged by its end 4' in the cavity for the sensor 2 and urges the latter into the key passage 16. When the key is introduced in the lock, the end of the key urges back the sensor 3 and brings the line of contact between the sensor and the push-member tangent to the outer surface of the rotor 2. This withdrawal of the push-member 4 therefore releases the rotor and clears the shoulder 8''' of the part 8 of the body 1.

At this moment, it is possible to rotate the key and drive the rotor. By rotating the rotor, the ramp $b$ urges back the stem 7 and the bolt member 6 until the tab 11 engages the ramp $d$ (FIG. 2). In this position, the nose portion 9 of the stem 7 is located in the region of the shoulder 8'''. In pursuing the rotation of the rotor, the radial ramp c comes into action and separates the bolt member stem 7 from the rotor 2. In this movement the nose portion 9 hooks on the shoulder 8''', the tab 11 remaining engaged on the ramp d. Note that after this position of the stem 7 has been reached, the bolt member is prevented from returning to the locking position by the hooking of the nose portion 9 and the cooperation of the tab 11 with the cylindrical cam 13.

In pursuing the rotation of the rotor, the position shown in FIG. 3 is reached. In this position, the bolt member is still maintained in a withdrawn position by the nose portion 9 and the tab 11.

The end 4' of the push-member 4 is engaged in a slight recess formed in the rotor in order to mark the "ON" position without this causing, however, the active portion 4'' of the push-member to touch the nose portion 9 of the stem 7. Note that the plateau d has sufficient extent to ensure, without modification of the position of the bolt member 6, the starter function which is usually ensured, in opposition to the action of a return spring (not shown), by the maximum rotation of the rotor.

In returning to the "OFF" position, the bolt member 6 is retained by the nose portion 9 and the tab 11 until the tab 11 leaves the ramp d. At this moment, it is the nose portion 9 which alone retains the bolt member 6.

The withdrawal of the key in the "OFF" position clears the key passage 16 in the region of the sensor 3. The push-member 4, urged by the spring 5, unhooks the nose portion 9 and thus releases the bolt member 6 which assumes the locking position under the action of the thrust exerted by the spring 12.

The anti-theft device according to the invention is associated in the conventional manner with a switch 19. The lock may be of the type having pistons or tumblers.

Thus, by means of the present invention there is achieved the safety required by regulations concerning anti-theft devices in a positive manner with no additional bolt.

In order to promote the locking of the anti-theft device by the nose portion 9, the bolt member stem 7, instead of being rectilinear has a slightly arched shape as shown in FIGS. 1, 2 and 3.

What is claimed is:

1. An anti-theft device for automobile vehicles of the type comprising a lock having a barrel actuated by a key, a locking bolt member extending longitudinally of the barrel, said barrel carrying a cam profile cooperating with the bolt member so as to shift the bolt member in a direction parallel to the axis of the barrel, wherein the bolt member is extended by a stem which is floatably mounted so as to be pivotable transversely of the axis of the bolt member, said stem being provided with a tab cooperating with a cam profile integral with said barrel which cam controls its transverse displacement, said stem having at the end thereof opposed to the bolt member a transverse nose portion adapted to be cooperable with a radial recess in the body of the anti-theft device, elastically yieldable means biasing said nose portion toward said recess, a radially movable push-member disposed in the bottom of said recess and elastically biased outwardly of the recess, and a key sensor radially mounted in the barrel and cooperating with said push-member.

2. An anti-theft device as claimed in claim 1, wherein the cam profile comprises a helical portion adjacent a radial plateau provided with a substantially radial projection.

3. An anti-theft device as claimed in claim 1, wherein the bolt member stem is transversely arch-shaped.

* * * * *